United States Patent Office 3,517,449
Patented June 30, 1970

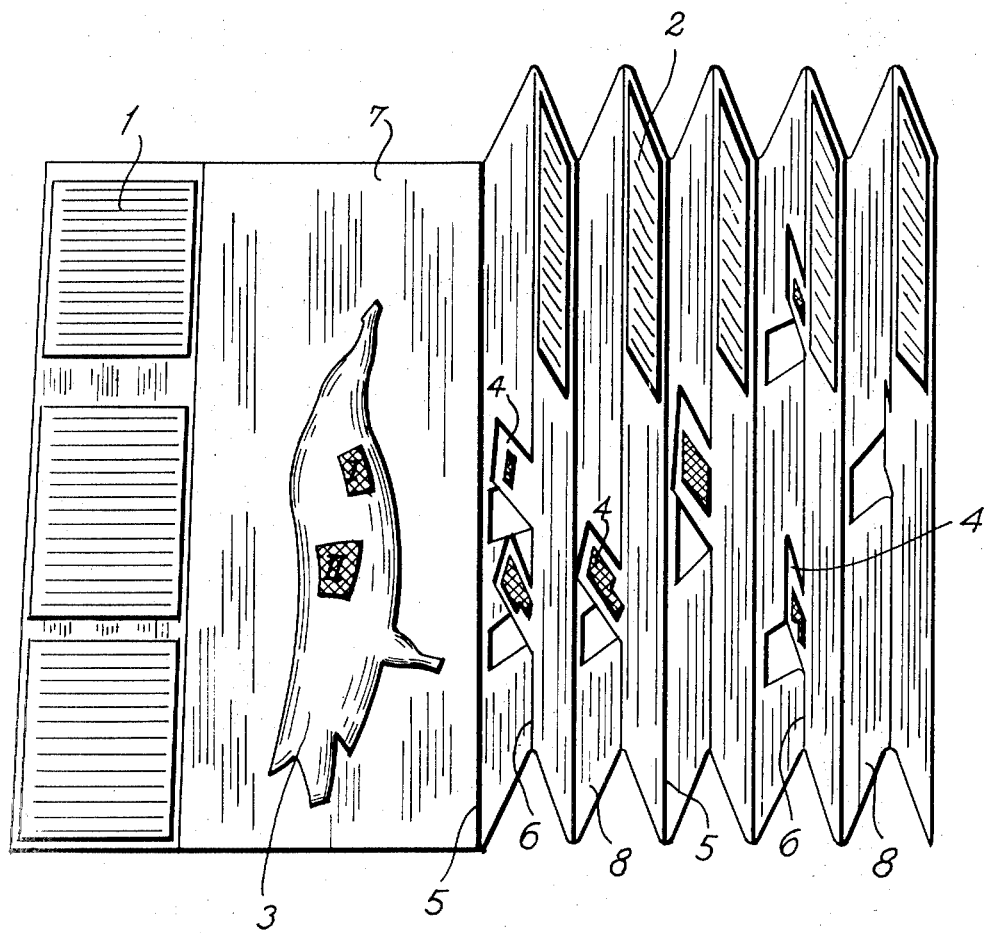

3,517,449
EDUCATIONAL AND INSTRUCTIONAL DEVICE
Jørgen Melchior Frandsen, Molholm, Vejle, and Erik Buddig Johansen, Aarhus, Denmark, assignors to Tulip Meat Packers, Vejle, Denmark
Filed Dec. 6, 1967, Ser. No. 688,459
Claims priority, application Sweden, May 16, 1967, 6,795/67
Int. Cl. G09b 29/04; B42d 15/04; G09f 1/00
U.S. Cl. 35—53                                     4 Claims

ABSTRACT OF THE DISCLOSURE

An educational and instructional device for illustrating the components of a three-dimensional body and consisting of a plate, preferably of cardboard, provided with a number of parallel folds so that the plate may be folded to form a corrugated element of superimposed layers, each layer having one or more tongues which in the folded position cooperate with the other tongues representing the components and arrangements of the three-dimensional body.

BACKGROUND OF THE INVENTION

Known devices of this kind have been proposed for illustrating the anatomy of the human body, and the known devices have plate sections representing the components of the three-dimensional body, each arranged on a sheet, all the sheets being assembled by stitching, stapling or gluing or in other manner to form a kind of book. Such devices are relatively complicated and expensive to manufacture, and it is only possible to study one sheet at a time as is the case with a book.

SUMMARY OF THE INVENTION

The invention consists in an educational and instructional device for readily illustrating the components of a three-dimensional body, and of the kind consisting of plate sections such as of cardboard, each of the components being represented by a plate section which can be placed beside, above or beneath the other plate sections to illustrate the composition of the three-dimensional body, wherein the said device consists of a plate, preferably of cardboard, provided with a number of parallel folds extending alternately to one side and the other, so that the plate may be folded and form a corrugated element of superimposed layers having a width corresponding substantially to the width of the area between two folds, every second area having one or more cut out tongues which are connected with the associated area along the folding line.

The device according to the invention may be constructed quite simply by providing a flat cardboard sheet with prints and punchings which form the tongues, after which the plate section is folded so that the tongues project from the folding lines and form the desired figure when the sheet is folded.

Since the whole sheet may be laid flat on a table so that all the areas between the folding lines will lie beside each other, all the tongues and the corresponding information printed in the areas are readily presented for simultaneous study.

It will be found convenient if, according to the invention there is no fold between each tongue and the associated area. During manufacture the tongues are punched out prior to folding, and the folding is thus performed in such manner that the connection lines between the tongues and the associated area are not folded. This will facilitate the use of the device since the tongues will always by themselves project outside the folded areas.

A wider range of applications is obtainable, according to the invention, if to the edge of one outer area adjacent a folding line there is joined a plate section which carries a figure showing the contour of the three-dimensional body and placed in such manner that, after folding of the areas, the tongues may be laid down thereon to illustrate the location of the components in the body.

In this embodiment the outline of the body itself may appear from the illustration on the said plate section, and the tongues may then be laid down on this picture so as to afford a clearer view. The said plate section may also be used for giving general information.

DESCRIPTION OF THE PREFERRED EMBODIMENT

An embodiment of an educational and instructional device according to the invention will now be described with reference to the drawing, which shows the device in its partly folded condition, viewed in perspective.

The device described serves to illustrate the parts of a pig, and it is formed of a flat, rectangular card-board sheet which in its flat condition is provided with printed information 1 and 2. There is further a printed picture 3 showing the outline of the pig.

Subsequent to or simultaneously with the printing, a number of tongues 4 are punched out, each of substantially rectangular shape and attached to the sheet at one side thereof. The sheet is then provided with ten folding lines 5 and 6, of which the first limits a comparatively large, flat section 7 containing the information 1 and the picture 3. Along the other folding lines the sheet is folded one way and the other alternately so as to form ten corrugated areas 8 which by means of the folding lines may be placed together to form a compact, folded parcel.

The folding lines 6 do not pass through the tongues 4 so that after folding, these tongues will be located approximately in a plane with the associated adjacent area and thus project to one side of the parcel when folded. The tongues 4 are placed in such manner that, when the folded parcel is folded over the innermost folding line 5, they overlie the picture 3 and can illustrate the location of the components of the carcass, that is, each tongue 4 represents a cut out piece of meat.

While the information 1 printed in the flat section 7 is of a general nature, the information 2 in the area 8 deals with the definite component represented by the corresponding tongue. The device may thus be studied in its fully unfolded position in which all tongues and all information may be studied simultaneously, without it being necessary to turn over leaves as with sheets bound in a book.

What is claimed is:

1. An educational and instructional device comprising a single plate of foldable material having a first section with alternate fold lines therein to form a corrugated arrangement of plate sections, and a second section joined to the corrugated arrangement along one of the end fold lines thereof, at least some of said plate sections including a respective tongue removed from an adjacent section and projecting beyond the associated fold line, each tongue being joined to the associated plate section without a fold, said tongues lying adjacent one another when the corrugated arrangement is pressed flat, so that the corrugated arrangement can be overfolded onto the second section with the tongues overlying the second section, said tongues and said second section having indicia means thereon to cooperatively provide instructional information.

2. A device as claimed in claim 1 wherein said foldable material is cardboard.

3

3. A device as claimed in claim 1 wherein the indicia means on said second section is a two dimensional representation of the outline of a three dimensional body, and the indicia means on the tongues are parts of said body, said tongues being positioned so that the parts illustrated thereon overly that part of the body, illustrated on the said second section, to which they correspond.

4. A device as claimed in claim 1 wherein said plate sections with said tongues have indicia means thereon related to the indicia means on said tongues.

References Cited

UNITED STATES PATENTS

| | | | |
|---|---|---|---|
| 730,859 | 6/1903 | Austin. | |
| 1,578,895 | 3/1926 | Joyce | 35—54 X |
| 1,648,654 | 11/1927 | Meller | 40—124 |
| 1,827,964 | 10/1931 | Amsden | 281—5 |

FOREIGN PATENTS

| | | |
|---|---|---|
| 1,015,732 | 8/1952 | France. |
| 60,431 | 4/1954 | France. |
| 20,736 | 1909 | Great Britain. |

EUGENE R. CAPOZIO, Primary Examiner

H. S. SKOGQUIST, Assistant Examiner

U.S. Cl. X.R.

40—124.1; 281—5; 283—62, 63